April 30, 1968 — R. S. ADAMS — 3,380,688
HELICOPTER HOIST

Filed Oct. 13, 1966 — 2 Sheets-Sheet 1

INVENTOR
ROGER S. ADAMS
BY T. Hayward Brown
ATTORNEY

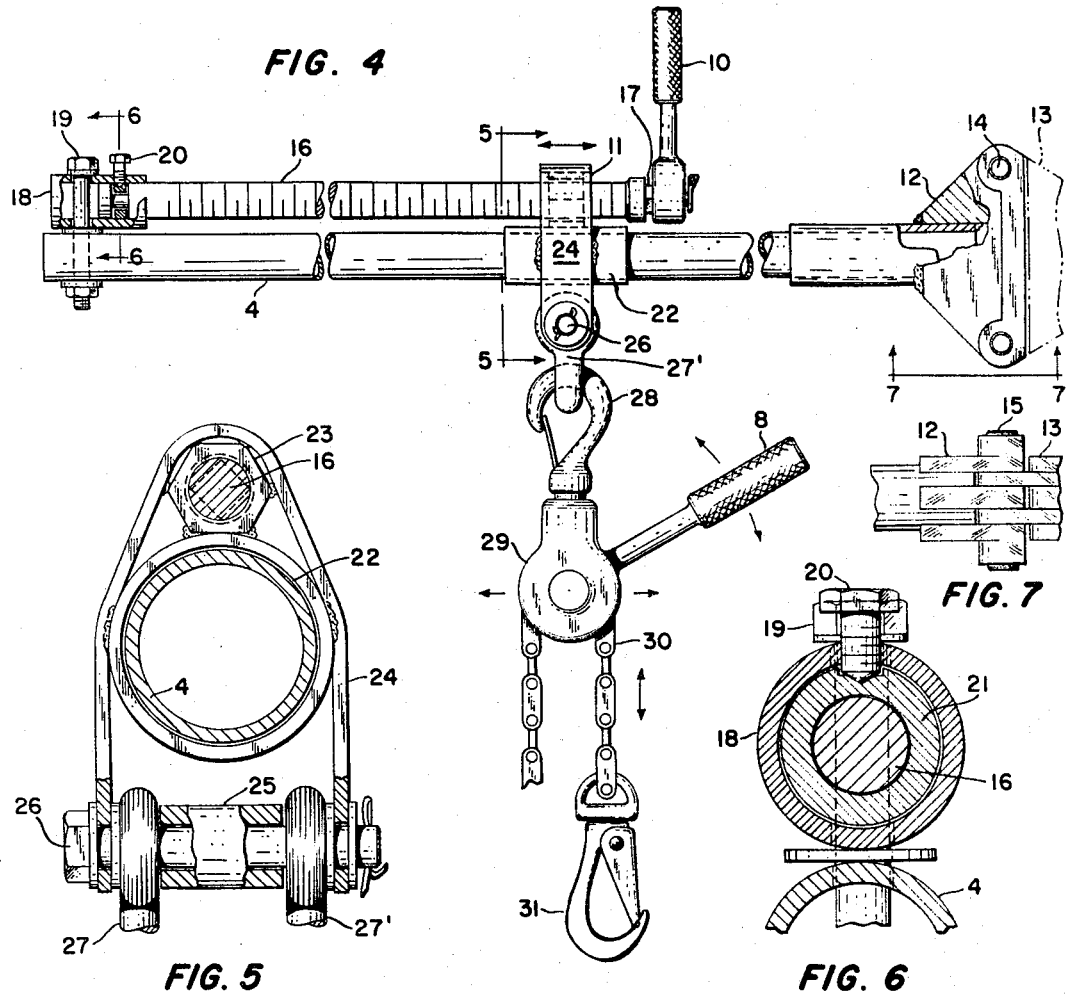
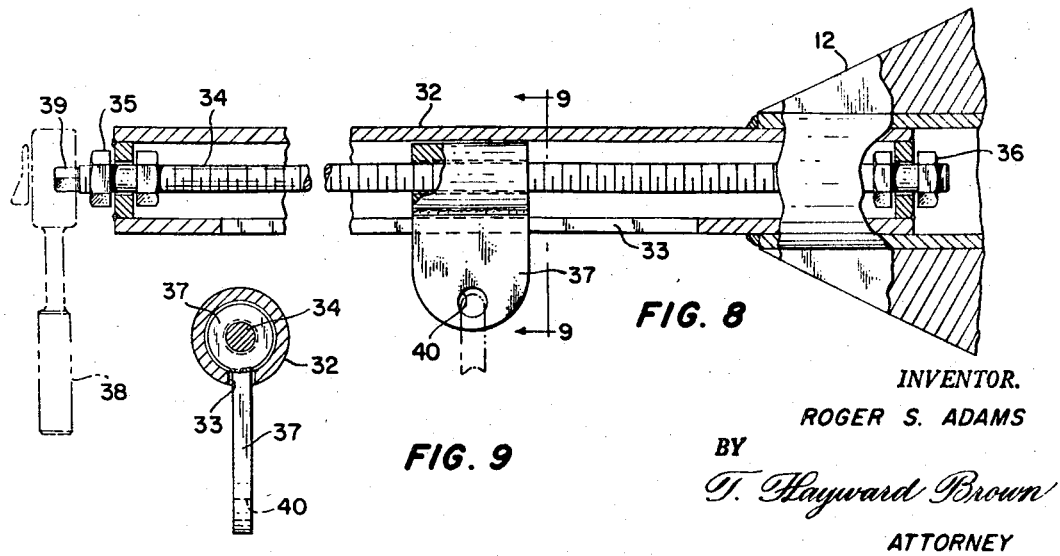

United States Patent Office 3,380,688
Patented Apr. 30, 1968

3,380,688
HELICOPTER HOIST
Roger S. Adams, 6801 20th St. N.,
St. Petersburg, Fla. 33702
Filed Oct. 13, 1966, Ser. No. 588,280
5 Claims. (Cl. 244—17.11)

The invention described and claimed herein may be used by or for the Government of the United States of America without the payment of royalties thereon.

This invention relates to a novel hoisting device which is capable of moving objects in horizontal, vertical and rotational planes. More particularly, this invention is concerned with an engine hoist particularly adapted for the mounting and/or dismounting of helicopter engines.

The servicing of helicopters in the field is often hampered by the inability to provide adequate ground support equipment. Thus, for example, the changing of a helicopter engine on inaccessible terrain or in the water or aboard a crowded ship has, in the past, been extremely difficult to accomplish in view of the inability to provide supporting equipment.

It is an object of this invention to provide means of hoisting and positioning aircraft engines particularly under conditions where ground support equipment is not available.

It is another object of this invention to provide hoisting equipment for helicopter engines which is markedly reduced in physical size and weight such that it is completely portable.

The above objects are accomplished by providing a hoisting device capable of moving objects both vertically and horizontally and which is adapted for connection with the rotor head of a helicopter in substitution for the rotor blade normally disposed thereon. The novel combination of a hoist with the rotor head of the helicoper results in a system capable of moving an object, such as an engine, to any desired position since the horizontal and vertical motions of the hoisting device, per se, are supplemented by the rotational capability of the rotor head to which the hoisting device is connected. As will be readily observed, this type of hoisting mechanism may be used on any helicopter and is particularly adapted for mounting engines located above or to the side of the helicopter under the rotor system.

The invention will be further understood by reference to the accompaying drawings in which:

FIG. 4 is an elevational view of the hoisting device and its connection to the rotor head;

FIG. 5 is a section along the line 5—5 of FIGURE 4;

FIG. 6 is a section taken along the line 6—6 of FIGURE 4;

FIG. 7 is a detailed bottom plan view along the line 7—7 of FIGURE 4;

FIG. 8 is a cross-sectional view of an alternative embodiment of a hoisting device;

FIG. 9 is a section on the line 9—9 of FIGURE 8.

Figure 1:
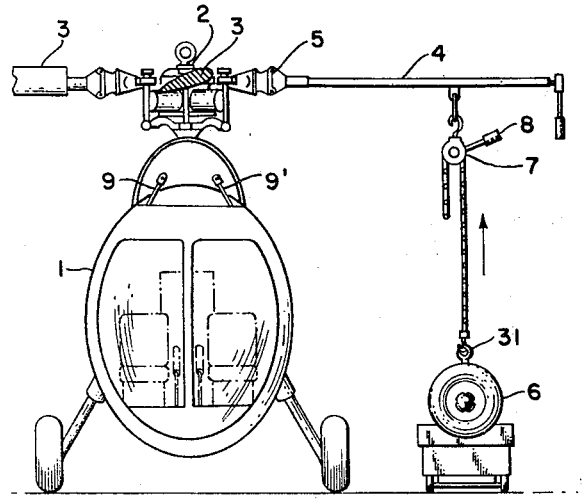
FIG. 1 is an end view of a helicopter in combination with a hoisting device.
Figure 2:
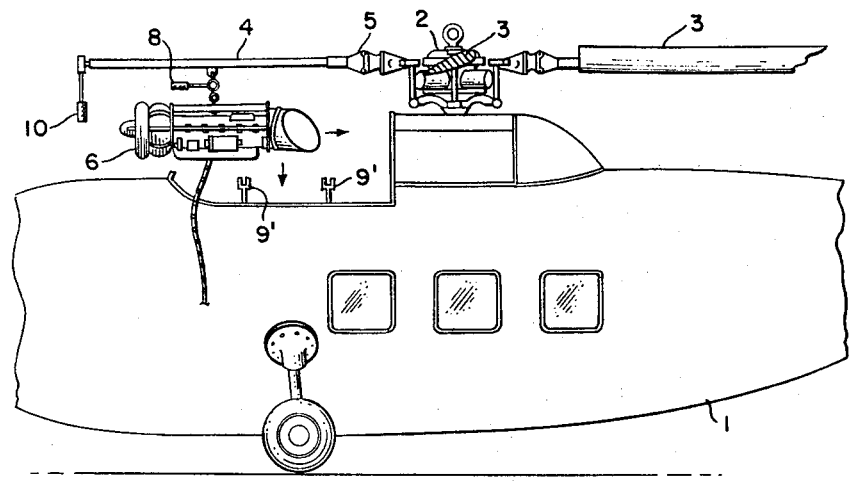
FIG. 2 is a side view of the hoisting device in combination with the helicopter subsequent to major vertical and rotational movements of the engine.
Figure 3:
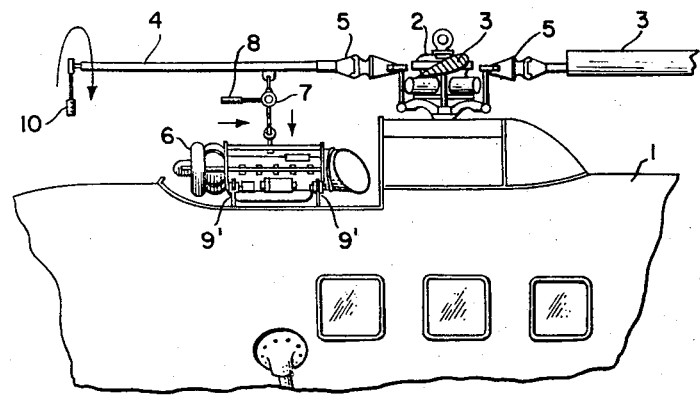
FIG. 3 is a side view of the helicopter-hoist combination after final, minor horizontal and vertical adjustments to position the engine.

Referring in more detail to the drawings, FIGS. 1, 2 and 3 depict the essentials of the operation of the novel helicopter hoisting device. As shown in FIGURE 1, a helicopter 1 having a conventional rotor head 2 and rotor blades 3 attached thereto is fitted with a hoisting device support generally designated at 4 which is connected to the rotor head, in substitution for the rotor blade, normally attached thereto, by a conventional blade-head connection 5. An engine 6 to be placed on motor mounts 9, 9' on the helicopter 1 is connected to a chain hoist 7 supported by the support 4 by means of a hook 31. Upon operation of the drive ratchet 8 the chain hoist will lift the engine to a position above the motor mounts 9, 9', as indicated by the vertical arrow in FIGURE 1. Subsequent to the lifting operation, the rotor head 2 will be revolved through an arc of 90° and the elevated engine 6 will assume the position shown in FIGURE 2. The engine 6 is brought to its final position on the motor mounts 9, 9' by the rotation of the drive ratchet 10 which causes the carriage 11 to move in a horizontal plane as indicated by the horizontal arrow in FIGURE 3. A final vertical adjustment is accomplished by operation of the drive ratchet 8 in a direction causing a lowering of the engine 6. As will be evident from the above description of the operation of the hoisting device, the present invention makes possible the rapid change of aircraft engines in any environment without the use of external ground support equipment such as cranes, booms, braces, etc. It will also be evident to those skilled in the art that the hoisting device is of such size and shape that it may easily be transported and installed.

While the present invention does not depend on the particular form of the hoisting device, except for its manner of connection to the helicopter rotor head, two practical embodiments for such a device are set forth in FIGURES 4 to 7 and 8 to 9. Referring in detail to the embodiment shown in FIGURE 4, there is depicted a hoisting device support 4 comprising a length of steel pipe or other similar material having connected thereto at one end a blade cuff 12 which is adapted to be complementary with the cuff 13 on the rotor head 2 of the helicopter. The cuffs are provided with complementary holes 14 which receive taper pins 15, thereby interlocking the hoisting device to the rotor head in the same manner in which rotor blades are normally positioned.

The hoisting device support 4 is provided with a carriage 11 which rides on support member 4 and provides the horizontal plane movement when positioning the engine 6 on the motor 9, 9' as shown in FIGURE 3. The carriage 11 comprises a slide collar 22 and an engaging nut 23 which engages screw jack 16. The screw jack 16, which is anchored at one end to the supporting member 4 by means of a collar 18 and a bolt 19, is turned by means of a ratchet drive 10 attached to socket 17 and is rotatably mounted at its opposite end by means of a screw collar 21 and set screw 20. The slide collar 22 and engaging nut 23 are held together by means of a frame 24 which, together with cross bar 25 and bolt 26, provide the support for vertical hoist connecting point 27, 27'. The vertical plane movement of an engine or other object is accomplished by a hoist which is a conventional chain-driven mechanism comprising an upper hook 28 for connecting the chain hoist to the horizontally movable carriage 11, a chain drive 29, chain 30, lifting hook 31, and drive ratchet 8.

A simplified embodiment of a hoisting device is depicted in FIGURES 8 and 9. In this embodiment, a supporting member 32 having a blade cuff 13 connected thereto at one end for connection to the rotor head 2 is provided with a slotted groove 33 which runs along a substantial portion of the length of the supporting member 32 along its lower side. Supporting member 32 is fitted internally with a screw jack 34 which is rotatably mounted at either end of said pipe by bolts 35 and 36. A slide carriage 37 rides on said screw 34, the lower portion of said slide extending through the slotted groove 33 to a point below the bottom side of supporting member 32. By turning the ratchet drive 38 attached to socket 39, slide carriage 37 is caused to move horizontally in either direction dependent upon the turning force. A hole 40 is provided in slide 37 for the purpose of receiving the upper hook of a conventional chain-drive hoist such as that depicted in FIGURE 4.

It will be readily apparent to those skilled in the art that many modifications can be made in the specific nature of the helicopter hoist without departing from the scope of the present invention, the true scope of which will be poined out in the appended claims.

What is claimed is:

1. In combination with a helicopter, a hoisting device capable of moving objects in horizontal, vertical and rotational planes with respect to said helicopter comprising a support member coupled to the rotor head of said helicopter, a carriage mounted for horizontal movement along said support and a hoist supported by said carriage.

2. The combination of claim 1 wherein said support member comprises a rotor blade cuff and is connected with a complementary cuff on said rotor head.

3. The combination of claim 1 wherein said carriage member is driven by a rotatable screw.

4. A helicopter engine hoist comprising a support member having a helicopter rotor blade cuff attached at one end thereto, a rotatable helicopter rotor head having a blade cuff complementary and interlocking with said support member blade cuff, horizontal plane drive means movably mounted on said supporting member, vertical plane drive means suspended from said horizontal drive means and engine holding means connected to said vertical plane drive means.

5. The engine hoist of claim 4 wherein said horizontal plane drive means is a rotatable screw and said vertical plane drive means is a chain hoist.

References Cited

FOREIGN PATENTS 1,051,648  2/1959  Germany.

FERGUS S. MIDDLETON, *Primary Examiner.*

P. E. SAUBERER, *Assistant Examiner.*